Figure 4:
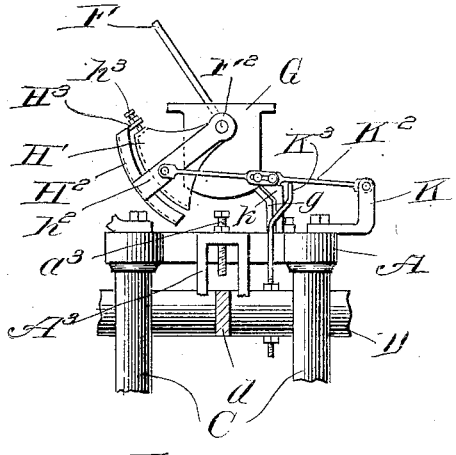

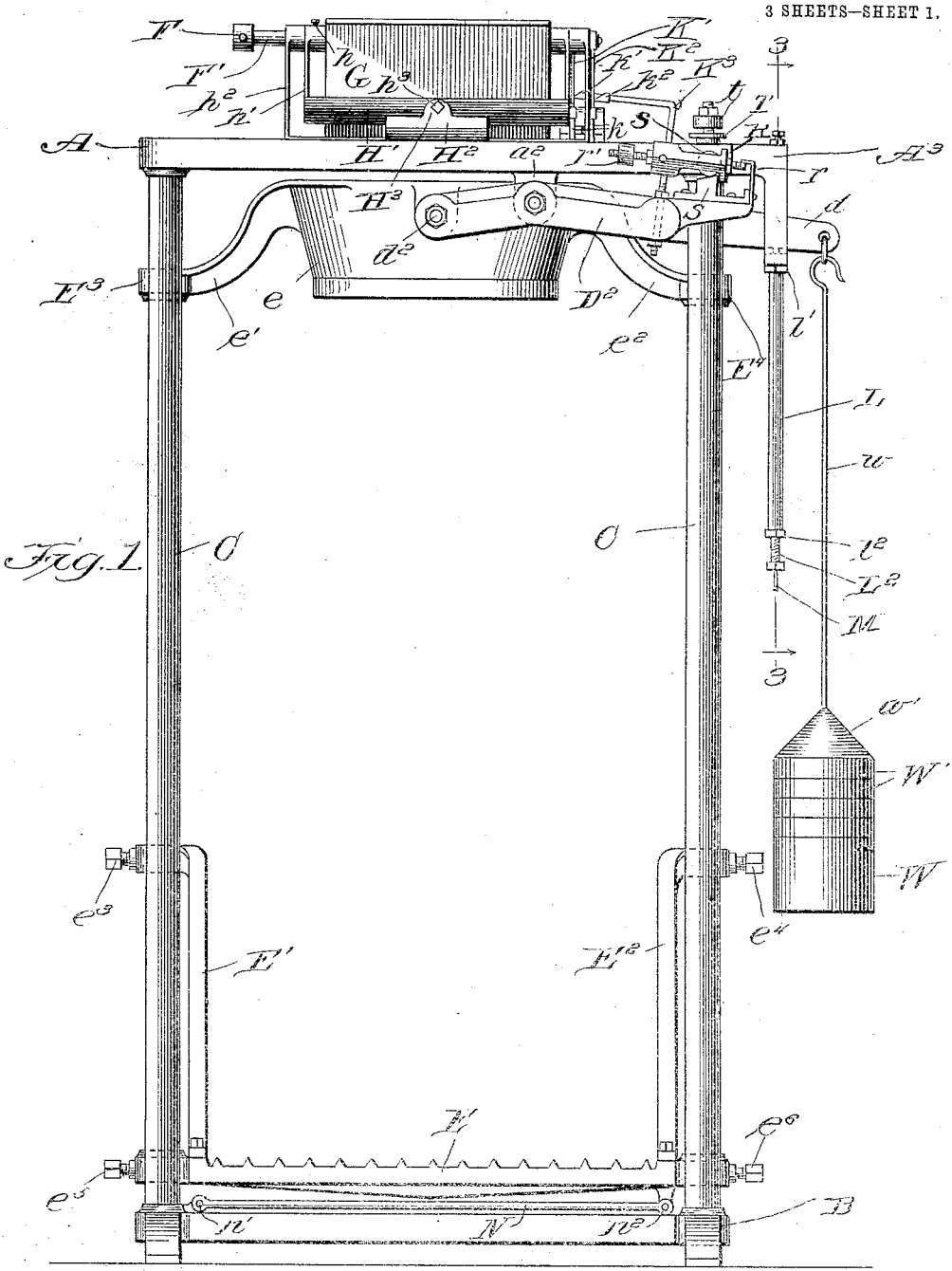

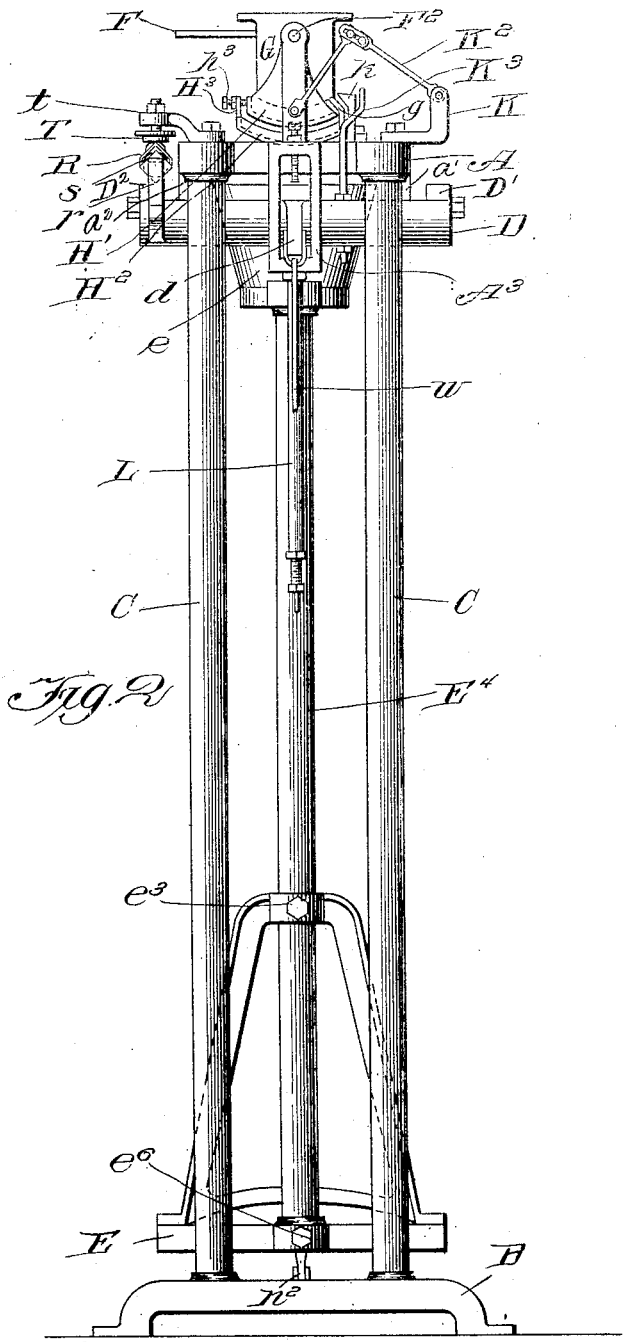

No. 842,665. PATENTED JAN. 29, 1907.
G. HOEPNER.
WEIGHING MACHINE.
APPLICATION FILED JUNE 17, 1905.

3 SHEETS—SHEET 3.

Witnesses:

Inventor:
George Hoepner

UNITED STATES PATENT OFFICE.

GEORGE HOEPNER, OF CHICAGO, ILLINOIS, ASSIGNOR TO UNION SCALE & MFG. CO., OF SAN FRANCISCO, CALIFORNIA, A CORPORATION OF CALIFORNIA.

WEIGHING-MACHINE.

No. 842,665.      Specification of Letters Patent.      Patented Jan. 29, 1907.

Application filed June 17, 1905. Serial No. 265,761.

*To all whom it may concern:*

Be it known that I, GEORGE HOEPNER, a citizen of the United States, residing at Chicago, county of Cook, State of Illinois, have invented a certain new and useful Improvement in Weighing-Machines; and I declare the following to be a full, clear, and exact description of the invention, such as will enable others skilled in the art to which it pertains to make and use the same, reference being had to the accompanying drawings, which form a part of this specification.

My invention relates in general to weighing-machines, and more particularly to machines for weighing predetermined quantities of material directly in bags or other closures.

In automatic weighing-machines of the type covered by United States Letters Patent No. 761,587, granted to me on May 31, 1904, the material to be weighed is supplied by gravity to a receptacle first in a large main flow until the receptacle has nearly received the predetermined quantity and subsequently in a small supplemental flow until the weight is counterbalanced. The flow of material to the receptacle is controlled by two gates, both of which are open during the main flow and then one gate is closed; but as it has a restricted opening through it the supply of material continues in a supplemental or completing flow. The second gate is closed entirely, cutting off the supply when the predetermined amount of material has been delivered to the receptacle.

The primary object of my invention is to provide a weighing-machine in which both the main supply and supplemental supply of material to the receiving-closure will be automatically terminated by means directly actuated by the movement of the scale-beam.

A further object of my invention is to provide in a weighing-machine of the type covered by my prior patent above referred to improved means for varying the proportions of the material supplied before and after the discontinuance of the main supply.

A further object of my invention is to provide an improved weighing-machine in which the material as it is automatically weighed will be deposited directly in a bag or closure for containing the same.

A still further object of my invention is to provide an improved weighing-machine which will be comparatively simple in construction, inexpensive in manufacture, and efficient in operation.

My invention will be more fully described hereinafter with reference to the accompanying drawings, in which the same is illustrated as embodied in a convenient and practical form, and in which—

Figure 5:
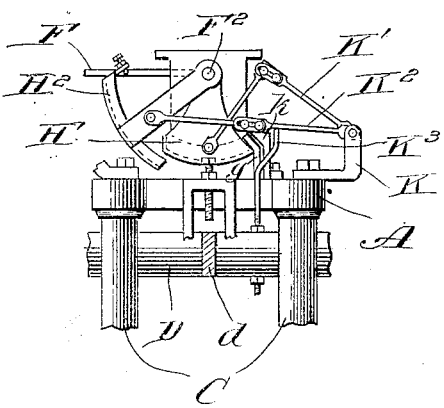
Figure 6:
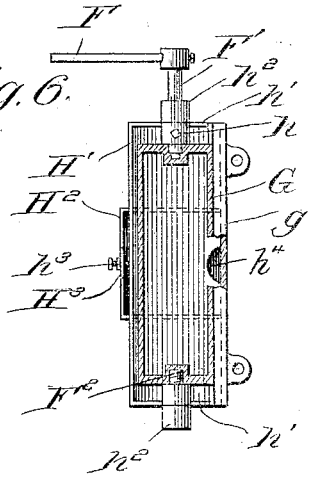
Figure 7:
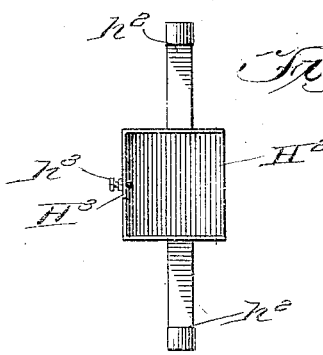
Figure 8:
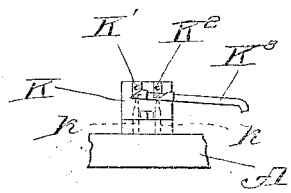
Figure 9:
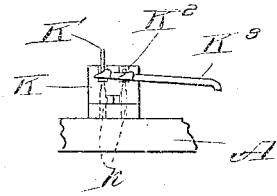

Figure 1 is an elevational view; Fig. 2, a side elevational view looking from the right in Fig. 1; Fig. 3, an enlarged detail view of the spring-plunger; Fig. 4, a view showing both of the gates open; Fig. 5, a view similar to Fig. 4, showing one of the gates closed; Fig. 6, a horizontal sectional view through the supply-hopper, showing the gates in plan; Fig. 7, a plan view of the outer gate; Fig. 8, a detail view showing the riser in position to break the toggle of the inner gate; and Fig. 9, a view similar to Fig. 8, showing the riser in position to break the toggle of the outer gate.

The same reference characters are used to designate the same parts in the several figures of the drawings.

Reference-letter A indicates the top supporting-frame which is mounted upon posts; C, the pair of posts at each side of the machine, being connected at their lower ends by a base B.

Reference characters $D'$ and $D^2$ indicate parallel arms for supporting the scale-beam D. The arms $D'$ and $D^2$ are pivotally supported intermediate of their ends upon brackets $a'$ and $a^2$, depending from the frame A. An arm $d$ projects outwardly from the scale-beam D and extends through the guide $A^3$, projecting from and supported by the frame A.

$e$ indicates a funnel adapted to extend within the upper end of a bag or closure into which the material is deposited as it is weighed. The funnel $e$ is pivotally connected, at opposite sides thereof, by means of pivot-pins, one of which is shown at $d^2$, Fig. 1, with the inner ends of the arms $D'$ and $D^2$ of the scale-beam. The funnel $e$ is provided with arms $e'$ and $e^2$, projecting from opposite sides thereof and supporting the upper ends of rods $E^3$ and $E^4$. The lower ends of the rods $E^3$ and $E^4$ are secured to and support a platform E, upon which the bottom of the bag or closure may rest. Any suitable means may be provided for adjustably securing the platform E to the rods $E^3$ and $E^4$, so that it may be adjusted vertically thereon to support bags or closures of various sizes in proper relation to the funnel $e$. I have shown brackets E' and E², projecting upwardly from the ends of the platform and provided with rings at their upper ends, surrounding the rods E³ and E⁴. Set-screws $e^3$ and $e^4$ adjustably secure the rings of the brackets to the rods. The lower ends of the rods project through rings extending laterally from the platform, suitable locking means, such as set-screws $e^5$ and $e^6$, being provided to retain the rods in the desired adjustment relative to the rings on the platform.

In order that the platform may be prevented from swinging with respect to the supporting-frame, a rod N is provided, one end of which is pivotally connected to a bracket $n'$, secured to the supporting-frame, while its other end is pivotally secured to a bracket $n^2$, extending from the platform E of the weighing-frame.

G indicates a supply-hopper through which the material passes to the funnel $e$. The hopper G is supported upon the frame A and is provided with a lower portion $g$, against which gates controlling the passageway through the hopper are adapted to swing.

H' indicates an inner gate which is provided with upwardly-extending arms $h'$, which surround stub-shafts F' and F². One of the arms $h'$ is rigidly secured to the stub-shaft F' by means of a set-screw $h$, while the other arm $h'$ loosely surrounds the stub-shaft F². The stub-shaft F² is rigidly secured to one outer end of the hopper G—as, for instance, by a screw-threaded projection engaging a socket in the hopper. The stub-shaft F' is loosely supported at its inner end in a socket in the other side wall of the hopper G. The gate H' is provided with a notch $h^4$, extending from its inner edge, as shown in Fig. 6, so that when such gate is closed the material may continue to flow in a restricted quantity through the hopper.

H² indicates a second gate located outside of the first gate and provided with upwardly-projecting arms $h^2$, loosely surrounding at their upper ends the stub-shafts F' and F². The gate H² is provided with an upwardly-extending bracket H³, through which the set-screw $h^3$ extends into the path of movement of an ear on the inner gate H'.

F indicates a hand-lever fixed to the stub-shaft F' and by means of which the inner gate is directly opened and the outer gate simultaneously opened through the contact of the ear on the inner gate with the set-screw $h^3$, carried by the outer gate.

K' indicates a pair of toggle-links pivotally connected at one end to one of the arms $h'$ of the inner gate and pivotally connected at its other end to a bracket K, projecting from the frame A. K² indicates a similar pair of toggle-links pivotally connected at one end to an arm $h^2$ of the outer gate and at its other end to the bracket K.

$k$ indicates stops projecting upwardly from the frame A, against which the joints of the toggle-links composing the pairs rest when the links are in alinement.

Projecting upwardly from and rigidly secured to the scale-beam D is a riser K³, extending inwardly at its upper end and underlying the toggle-links. A cam $k'$ at the end of the riser K³ is adapted to break the toggle-links K' after a predetermined movement of the scale-beam, while a second cam $k^2$ on the riser is adapted to break the toggle-links K² upon the completion of the movement of the scale-beam.

Suitable means are provided for limiting the movement of the scale-beam so that it will not rise sufficiently to break the toggle-links K² at the same time that it breaks the toggle-links K'. I have shown herein the same means for this purpose as disclosed in my prior patent above referred to which consists in a raceway R, within which a ball $s$ is adapted to be rolled. The raceway is pivotally supported upon the frame A and is provided with an adjustable weight $r'$, extending from the opposite side of its fulcrum from that in which the ball is supported. Projecting from the end of the raceway opposite to the weight $r'$ is a stud which extends beneath the inturned upper end of a bracket $r$, rigidly secured to the arm D² of the scale-beam.

S designates an inclined lug fixed upon the arm D² in alinement with an opening in the raceway. Located in alinement above the lug S is a stop T, which depends from and is adjustably supported by a bracket $t$, projecting laterally from the arm A.

In order that the proportion of material supplied to the funnel $e$ prior to closing the inner gate may be varied, thereby varying the quantity of material which must be supplied after the closing of such gate to complete the predetermined amount, I provide a spring-actuated plunger which assists the movement of the scale-beam sufficient to break the toggle-links K', but which does not assist in further movement of the scale-beam. I have shown such plunger as consisting in a rod M, engaging at its upper end beneath the arm $d$ of the scale-beam, as clearly shown in Fig. 3. The rod M is surrounded by a tube L, the upper end of the latter being supported around a screw-threaded plug $l$, depending from the lower end of the guide A³.

$l'$ indicates a lock-nut for securing the plug immovably to the guide. Adjustably located within the lower end of the tube L is a screw-threaded sleeve L², surrounded by a nut-lock $l^2$, through which the rod M loosely extends. The spring M' surrounds the rod M and bears at its lower end upon the upper end of the sleeve L² and at its upper end against a collar m, fixed to the rod M. It is obvious that by adjusting the sleeve L² the tension of the spring M' may be varied, thereby regulating the pressure exerted by the upper end of the rod M against the arm d of the scale-beam.

w indicates a hanger-rod for supporting the weights, the upper end of the rod being connected to the outer end of the arm d of the scale-beam. W indicates a weight fixed to the lower end of the rod w and above which other weights W' may be located. w' indicates a conical weight loosely supported upon the rod w, which may be lifted to permit the location of the weights W' above the weight W.

The operation of my invention is as follows: The proper number of weights are placed upon the hanger w corresponding to the quantity of material which it is desired to be weighed. The weights oscillate the scale-beam, thereby lifting upwardly the funnel e and also forcing downwardly the rod M against the tension of the spring M'. The gates H' and H² are opened by oscillating stub-shaft F' through the medium of the hand-lever F. The swinging open of the gates permits the pairs of toggle-links K' and K² to fall into alinement, as shown in Fig. 4, thereby holding the gates open. The material is supplied to the hopper G and when both of the gates are open passes freely through the hopper and funnel e into the bag or other closure. When a sufficient quantity of material has passed through the funnel e to oscillate the scale-beam a predetermined distance, the cam k' on the riser K³ thereof engages beneath the toggle-links K', breaking the joint thereof so that the inner gate H' is allowed to close, thereby restricting the flow of material to the funnel e to an amount capable of passing through the notch h⁴ in the edge of such gate. The tension of the spring M', acting through the rod M, assists the material in oscillating the scale-beam sufficiently to break the toggle-links K', and thereby close the inner gate. The momentum of the scale-beam, due to the first movement thereof, is prevented from being sufficient to break the toggle-links K² by means of the ball s, which is caught between the lug S and the stop T, thereby stopping the movement of the scale-beam. The ball s, after having stopped the movement of the scale-beam, rolls from above the lug S owing to the weight r' oscillating the raceway. The bracket r serves to again oscillate the raceway in position to locate the ball above the lug S when the material has been removed from the platform E. After the inner gate has been closed the material is supplied in a restricted flow to the funnel e, and when the weights are counterbalanced by the material the scale-beam moves such a distance that the cam k² on the riser K³ breaks the toggle-links K², thereby permitting the outer gate H² to close and completely cut off the flow of material to the funnel e. The weighed material is then removed from the platform E and a new bag or closure placed in position to receive the succeeding predetermined quantity of weighed material.

From the foregoing description it will be observed that I have invented an improved weighing-machine in which the material is deposited directly in the bag or closure for containing the same, in which the main and supplemental flow of material to the closure for receiving the same are controlled by means directly connected to the scale-beam, and in which the movement of the scale-beam to restrict the flow of material is assisted by a spring-plunger, which ceases to assist the movement of the scale-beam prior to the complete cutting off of the supply of the material.

Having now fully described my invention, what I claim as new, and desire to secure by Letters Patent, is—

1. In a weighing-machine, the combination with a scale-beam, of means for supporting upon said scale-beam a receptacle to receive the material to be weighed, a gate for restricting the flow of material to said receptacle, a second gate for cutting off the restricted flow of material, pairs of toggle-links for holding said gates open, and a riser carried by the scale-beam for successively breaking said toggle-links thereby closing said gates.

2. In a weighing-machine, the combination with a scale-beam, of means for supporting upon the scale-beam a receptacle to receive the material to be weighed, means for restricting the flow of material to said receptacle, means for cutting off the restricted flow of material, mechanism actuated directly by the scale-beam to successively operate both of said means, means for preventing the scale-beam rising sufficiently when operating said first means to operate said second means, and means for assisting the movement of the scale-beam in operating said first means.

3. In a weighing-machine, the combination with a scale-beam, of means for supporting upon the scale-beam a receptacle to receive the material to be weighed, an oscillating gate for restricting the flow of material to the receptacle, a rotary shaft to which said gate is fixed, a hand-lever on said shaft, a second gate for cutting off the restricted flow of material, mechanism actuated directly by the scale-beam for successively closing said gates, and means for opening both of said gates by moving said hand-lever.

4. In a weighing-machine, the combination with a scale-beam, of means for supporting upon the scale-beam a receptacle to receive the material to be weighed, a gate for restricting the flow of material to said receptacle, an oscillating shaft to which said gate is fixed, a hand-lever on said shaft, a second gate for cutting off the restricted flow of material, pairs of toggle-links for holding said gates open, a riser carried by the scale-beam for successively breaking said toggle-links and thereby closing said gates, and means for opening both of said gates by a movement of said hand-lever.

5. In a weighing-machine, the combination with a scale-beam, of means for supporting upon the scale-beam a receptacle to receive the material to be weighed, means for restricting the flow of material to said receptacle, means for cutting off the restricted flow of material, mechanism actuated directly by the rising of the scale-beam for successively operating both of said means, a spring-actuated plunger engaging said scale-beam and tending to lift the same, and means for discontinuing the action of said plunger when the scale-beam has moved sufficiently to operate said first means.

In testimony whereof I sign this specification in the presence of two witnesses.

GEO. HOEPNER.

Witnesses:
GEO. L. WILKINSON,
EDWIN M. ASHCRAFT, Jr.